(12) United States Patent
Hecking et al.

(10) Patent No.: US 12,122,869 B2
(45) Date of Patent: Oct. 22, 2024

(54) POLYISOCYANATE COMPOSITION FOR COATINGS

(71) Applicant: Covestro Intellectual Property GmbH & Co. KG, Leverkusen (DE)

(72) Inventors: Andreas Hecking, Langenfeld (DE); Christoph Eggert, Cologne (DE); Nusret Yuva, Burscheid (DE); Achim Meyer, Leverkusen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 699 days.

(21) Appl. No.: 17/294,777

(22) PCT Filed: Nov. 21, 2019

(86) PCT No.: PCT/EP2019/082055
§ 371 (c)(1),
(2) Date: May 18, 2021

(87) PCT Pub. No.: WO2020/109125
PCT Pub. Date: Jun. 4, 2020

(65) Prior Publication Data
US 2022/0010053 A1    Jan. 13, 2022

(30) Foreign Application Priority Data

Nov. 28, 2018 (EP) .................... 18208988

(51) Int. Cl.
*C08G 18/73* (2006.01)
*C08G 18/62* (2006.01)
*C08G 18/72* (2006.01)
*C08G 18/75* (2006.01)
*C09D 7/48* (2018.01)
*C09D 175/04* (2006.01)

(52) U.S. Cl.
CPC ......... *C08G 18/73* (2013.01); *C08G 18/6229* (2013.01); *C08G 18/722* (2013.01); *C08G 18/755* (2013.01); *C09D 7/48* (2018.01); *C09D 175/04* (2013.01)

(58) Field of Classification Search
CPC .. C08G 18/73; C08G 18/6229; C08G 18/722; C08G 18/755; C08G 18/022; C08G 18/792; C09D 7/48; C09D 175/04; C09D 175/02
See application file for complete search history.

(56) References Cited

U.S. PATENT DOCUMENTS

| 4,419,513 | A |  | 12/1983 | Breidenbach et al. |
| 5,914,383 | A |  | 6/1999 | Richter et al. |
| 6,160,075 | A |  | 12/2000 | Plogmann et al. |
| 10,081,703 | B2 |  | 9/2018 | Tsukada et al. |
| 11,091,584 | B2 |  | 8/2021 | Hecking et al. |
| 2018/0079852 | A1 | * | 3/2018 | Hecking ............. C09D 175/06 |
| 2018/0208709 | A1 | * | 7/2018 | Hecking ............. C08G 18/8093 |
| 2020/0002462 | A1 |  | 1/2020 | Hecking et al. |

FOREIGN PATENT DOCUMENTS

| CA | 1335990 C | 6/1995 | |
| CA | 2154107 A1 | 1/1996 | |
| CA | 2223762 A1 | 12/1996 | |
| CA | 2163169 C | 10/2006 | |
| DE | 1493360 B1 | 1/1970 | |
| GB | 1225450 A | 3/1971 | |
| WO | WO-2016146574 A1 * | 9/2016 | ........... C08G 18/092 |
| WO | WO-2017021150 A1 * | 2/2017 | ........... C08G 18/246 |
| WO | 2018092717 A1 | 5/2018 | |
| WO | 2018146145 A1 | 8/2018 | |

OTHER PUBLICATIONS

Laas, H. J. et al, J. Prakt. Chem. 1994, 336, 185-200.
Siefken, W., Liebigs Ann. Chem. 1949, 562, p. 122.
Meier-Westhues, U., Polyurethane—Lacke, Kleb—und Dichtstoffe, Hanover, Vincentz Network 2007 on pp. 36-43.
International Search Report, PCT/EP2019/082055, date of mailing: Jan. 27, 2020, Authorized officer: Martin Bergmeier.

* cited by examiner

*Primary Examiner* — K. Boyle
(74) *Attorney, Agent, or Firm* — The Webb Law Firm

(57) ABSTRACT

The present invention relates to a polyisocyanate composition, comprising a mixture of ≥60 wt. %, relative to the total weight of the mixture, of at least one polyisocyanate based on pentamethylene diisocyanate and ≤40 wt. %, relative to the total weight of the mixture, of at least one polyisocyanate based on a cycloaliphatic diisocyanate and and/or of at least one polyisocyanate based on pentamethylene diisocyanate and at least one cycloaliphatic diisocyanate, the polyisocyanate composition having a residual monomer content of monomer diisocyanates below 0.5 wt. %, relative to the total weight of the polyisocyanate composition.

12 Claims, No Drawings

POLYISOCYANATE COMPOSITION FOR COATINGS

CROSS REFERENCE TO RELATED APPLICATIONS

This application is a national stage application (under 35 U.S.C. § 371) of PCT/EP2019/082055, filed Nov. 21, 2019, which claims benefit of European Application No. 18208988.8, filed Nov. 28, 2018, both of which are incorporated herein by reference in their entireties.

FIELD OF THE INVENTION

The invention relates to a polyisocyanate composition based on pentamethylene diisocyanate. The invention further relates to a process for producing the polyisocyanate composition according to the invention and to the use of the polyisocyanate composition according to the invention as a crosslinking agent in a coating composition. The invention additionally relates to the use of pentamethylene diisocyanate for increasing the chemical resistance of the resulting coating. The invention also relates to a two-component system comprising the polyisocyanate composition according to the invention, to coatings produced from the two-component system, and to the substrates coated therewith.

BACKGROUND OF THE INVENTION

For coatings, particularly in the automobile industry segment, both scratch resistance and chemical resistance are important coatings properties. Recognized methods established in Europe are the Amtec Kistler laboratory carwash for testing the scratch resistance, and the gradient oven method for the chemical resistance. The company Amtec Kistler GmbH uses a laboratory carwash to simulate the carwash resistance of clearcoats. The conditions in this laboratory carwash (water quantity, brush rotation speed, brush material, relative movements) are based on those in an OEM carwash. The gradient oven method for the chemical resistance tests the resistance of the coating film to tree resin, pancreatin (simulated avian excrement), deionized water, dilute sodium hydroxide solution, and dilute sulfuric acid at various temperatures with an exposure time of 30 min.

Polyurethane coatings are long established. For high-grade lightfast topcoats in this context, use is made particularly of aliphatic polyisocyanates and polyols such as, for example, polyacrylate polyols, polyester polyols, or polycarbonate polyols. Polyisocyanates employed for these high-grade coatings are particularly low-monomer-content derivatives prepared from hexamethylene diisocyanate (HDI). Particularly suitable for elastic coatings of high integrity, in turn, are isocyanurate polyisocyanates of HDI, or HDI polyisocyanates containing iminooxadiazinedione and isocyanurate structures, as are described for example in H. J. Laas, R. Halpaap, J. Pedain, J. prakt. Chem. 1994, 336, 185-200 or in EP 0 330 966 B1 or EP 0 798 299 B1. These polyisocyanates generally have isocyanate functionalities ($F_{NCO}$) of 3 or more, with isocyanate functionality referring to the mean number of NCO groups per molecule.

As well as HDI, pentamethylene 1,5-diisocyanate (PDI) is a long-established monomer, as described for example by W. Siefken, Liebigs Ann. Chem. 1949, 562, page 122 or in DE 1493360 B1 and DE 1900514 A1.

EP 0 693 512 A1 describes the use of specific mixtures of HDI-based polyisocyanates which, by virtue of a fraction of uretdione structures and cycloaliphatic isocyanurate polyisocyanates, feature improved elasticity and tensile strength relative to coatings crosslinked solely by HDI polyisocyanate. There is, though, no disclosure as to the chemical resistance of these coatings toward environmental influences.

DE 197 52 691 discloses the use of a polyisocyanate mixture based on 2-methylpentane 1,5-diisocyanate in combination with isophorone diisocyanate (IPDI). 2-Methylpentane 1,5-diisocyanate, however, is not available in commercially relevant quantities and is therefore not a practical substitute for HDI polyisocyanates.

WO 96/40828 A1 discloses nonaqueous dispersions, especially suitable for use as automobile "enamel" coatings, tasked with reducing the fraction of volatile organic compounds. While polyisocyanates as crosslinkers for alkyd resins are described, the examples only use pure IPDI isocyanurate and there is no possibility of comparisons with other isocyanates. A drawback of pure IPDI isocyanurates, however, is the inadequate flexibility they engender in coatings.

It was thus still desirable to provide polyisocyanates from which flexible coatings are obtainable that feature improved chemical resistance to sodium hydroxide solution and/or pancreatin, with a scratch resistance matching that of the known coatings based on HDI or 2-methylpentane 1,5-diisocyanate.

It was therefore an object of the present invention to provide a polyisocyanate composition from which flexible coatings are obtainable that feature greater chemical resistance to sodium hydroxide solution and/or pancreatin, with a scratch resistance matching that of the known prior-art systems based on HDI or 2-methylpentane 1,5-diisocyanate.

DETAILED DESCRIPTION OF THE INVENTION

This object has been achieved according to the invention by a polyisocyanate composition comprising a mixture of ≥60 wt %, based on the total weight of the mixture, of at least one polyisocyanate based on pentamethylene diisocyanate and ≤40 wt %, based on the total weight of the mixture, of at least one polyisocyanate based on a cycloaliphatic diisocyanate and/or of at least one polyisocyanate based on pentamethylene diisocyanate and at least one cycloaliphatic diisocyanate, where the polyisocyanate composition has a residual monomer content of monomeric diisocyanates of below 0.5 wt %, based on the total weight of the polyisocyanate composition.

Beneficially it has proven possible, through the use of pentamethylene diisocyanate in the polyisocyanate composition, to reduce the fraction of cycloaliphatic diisocyanates without impairing the scratch resistance. Hence an improved chemical resistance is attainable, and the flexibility is retained.

According to the invention, the references to "comprising", "containing", etc., preferably denote "substantially consisting of" and very preferably denote "consisting of". The further embodiments identified in the claims and in the description can be combined arbitrarily, provided the context does not clearly indicate that the opposite is the case.

In a first preferred embodiment the mixture comprises ≥70 wt %, preferably ≥75 wt % and more preferably ≥80 wt %, based on the total weight of the mixture, of the at least one polyisocyanate based on pentamethylene diisocyanate, and the fractions making up the balance to 100 wt % consist of the at least one polyisocyanate based on a cycloaliphatic diisocyanate and/or of the at least one polyisocyanate based on pentamethylene diisocyanate and at least one cycloaliphatic diisocyanate, preferably consist of the at least one polyisocyanate based on a cycloaliphatic diisocyanate or of the at least one polyisocyanate based on pentamethylene diisocyanate and at least one cycloaliphatic diisocyanate, and more preferably consist of the at least one polyisocyanate based on a cycloaliphatic diisocyanate. One of the benefits of this is that the chemical resistance is further improved without lowering the necessary retention of flexibility on the part of the system.

The polyisocyanates based on pentamethylene diisocyanate are any oligomeric polyisocyanates that are obtainable by modification of pentamethylene diisocyanate (PDI) and have uretdione, isocyanurate, allophanate, biuret, iminooxadiazinedione and/or oxadiazinetrione structure, or any desired mixtures of such polyisocyanates. These polyisocyanates are produced by methods known per se for isocyanate oligomerization, such as are described, for example, in J. Prakt. Chem. 336 (1994) 185-200 or EP 0 798 299 A1, by reacting a portion of the isocyanate groups of PDI to form polyisocyanate molecules consisting of at least two diisocyanate molecules, and by generally subsequent removal of unreacted monomeric PDI by distillation or extraction.

The isocyanurate trimer content can be adjusted by appropriate reaction regime and thus the trimerization reaction is preferably terminated after reaching the desired isocyanurate trimer content. This may be accomplished, for example, by cooling the reaction mixture to room temperature. Generally, however, the reaction is ended by adding one or more catalyst poisons known to those skilled in the art and optionally subsequent brief heating of the reaction mixture, for example to a temperature above 80° C.

"Polyisocyanate based on pentamethylene diisocyanate" is presently understood to mean that pentamethylene diisocyanate makes up ≥50 wt %, preferably ≥70 wt %, more preferably ≥90 wt % and very preferably 100 wt % of the monomeric diisocyanates used overall for the polyisocyanate. This produces the further benefit of a further improvement in the chemical resistance of the coatings obtained.

The balance to 100 wt % may consist of any desired aliphatic, araliphatic and/or aromatic diisocyanates other than pentamethylene diisocyanate; monomeric diisocyanates suitable for this purpose are, in particular, those from the molecular weight range 140 to 400, such as, for example, 1,4-diisocyanatobutane, hexamethylene 1,6-diisocyanate, 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 2,4- and 2,6-diisocyanato-1-methylcyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 2,4'-diisocyanatodicyclohexylmethane, 1-isocyanato-1-methyl-4(3)-isocyanatomethylcyclohexane, bis(isocyanatomethyl)norbornane, 1,3- and 1,4-bis(isocyanatomethyl)benzene (XDI) or any desired mixtures of such diisocyanates.

The PDI used for preparing the polyisocyanates based on pentamethylene diisocyanate is obtainable in various ways, for example by phosgenation in the liquid or gas phase or by a phosgene-free route, for example by thermal urethane cleavage proceeding from pentamethylenediamine (PDA) obtained preferably by means of biotechnology via decarboxylation of the naturally occurring amino acid lysine. Preparation of PDI from PDA by gas-phase phosgenation is particularly preferred. Aforesaid further diisocyanates are accessible by various known methods, for example by phosgenation in the liquid or gas phase or else by a phosgene-free route, for example by thermal urethane cleavage.

The polyisocyanates based on a cycloaliphatic polyisocyanate are any oligomeric polyisocyanates that are obtainable by modification of suitable monomeric cycloaliphatic diisocyanates and have uretdione, isocyanurate, allophanate, biuret, iminooxadiazinedione and/or oxadiazinetrione structure, or any desired mixtures of such polyisocyanates. These polyisocyanates are produced by methods known per se for isocyanate oligomerization, such as are described, for example, in J. Prakt. Chem. 336 (1994) 185-200, by reacting a portion of the isocyanate groups of monomeric diisocyanates to form polyisocyanate molecules consisting of at least two diisocyanate molecules, and a generally subsequent removal of unreacted monomeric diisocyanates by distillation or extraction. Polyisocyanates can be prepared from different monomeric diisocyanates by known methods, as known from EP 47 452 A1, for example.

In a further preferred embodiment the mixture of the polyisocyanate composition comprises ≥1 wt %, preferably ≥2 wt %, more preferably ≥5 wt %, very preferably ≥10 wt % and most preferably ≥20 wt %, based on the total weight of the mixture, of the at least one polyisocyanate based on a cycloaliphatic diisocyanate and/or of the at least one polyisocyanate based on pentamethylene diisocyanate and at least one cycloaliphatic diisocyanate, preferably of the at least one polyisocyanate based on a cycloaliphatic diisocyanate.

In a further preferred embodiment the mixture of the polyisocyanate composition comprises ≥1 wt %, preferably ≥2 wt %, more preferably ≥5 wt %, very preferably ≥10 wt % and most preferably ≥20 wt %, based on the total weight of the mixture, of the at least one polyisocyanate based on a cycloaliphatic diisocyanate or of the at least one polyisocyanate based on pentamethylene diisocyanate and at least one cycloaliphatic diisocyanate, preferably of the at least one polyisocyanate based on a cycloaliphatic diisocyanate.

In a further preferred embodiment "based on pentamethylene diisocyanate and at least one cycloaliphatic diisocyanate" means that the at least one cycloaliphatic diisocyanate makes up ≥50 wt %, preferably ≥60 wt %, more preferably ≥70 wt % of the monomeric diisocyanates used overall. This produces the further benefit of a further improvement in the resistance toward mechanical stress.

The balance to 100 wt % may consist, besides pentamethylene diisocyanate, of any cycloaliphatic diisocyanates listed above and different from pentamethylene diisocyanate.

"Based on a cycloaliphatic diisocyanate" is presently understood to mean that a defined cycloaliphatic, monomeric diisocyanate makes up ≥50 wt %, preferably ≥70 wt %, more preferably ≥90 wt % and very preferably 100 wt % of the cycloaliphatic monomeric diisocyanates used overall.

The balance to 100 wt % may consist of any desired cycloaliphatic diisocyanates other than this cycloaliphatic diisocyanate; monomeric diisocyanates suitable for this purpose are, in particular, those from the molecular weight range 140 to 400, such as, for example, 1,3- and 1,4-diisocyanatocyclohexane, 2,4- and 2,6-diisocyanato-1-methylcyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 2,4'-diisocyanatodicyclohexylmethane, 1-isocyanato-1-methyl-4(3)-isocyanatomethylcyclohexane, bis(isocyanatomethyl)bicyclo[2.2.1]heptane, 2,5-diisocyanato-1,4:3,6-dianhydro-2,5-dideoxy-L-iditol, 2,5 -bis(isocyanatomethyl)-1,4:3,6- dianhydro-2,5-dideoxy-L-iditol, 2,5-bis(isocyanatomethyl) tetrahydrofuran, bis(isocyanatomethyl)norbornane, or any desired mixtures of such diisocyanates. The stated diisocyanates are obtainable as already described for example above.

Within the present invention, however, it is especially preferred if the cycloaliphatic diisocyanate is selected from the group consisting of 1,3- and 1,4-diisocyanatocyclohexane, 2,4- and 2,6-diisocyanato-1-methylcyclohexane, 1,3- and 1,4-bis(isocyanatomethyl)cyclohexane, 1-isocyanato-3,3,5-trimethyl-5-isocyanatomethylcyclohexane, 4,4'-diisocyanatodicyclohexylmethane, 2,4'-diisocyanatodicyclohexylmethane, 1-isocyanato-1-methyl-4(3)-isocyanatomethylcyclohexane, and bis(isocyanatomethyl) norbornane, and preferably is 1-isocyanato-3,3,5-trimethyl-5-isocyanatomethylcyclohexane.

In a further preferred embodiment the polyisocyanate composition according to the invention consists to an extent of ≥70 wt %, preferably ≥85 wt %, more preferably ≥95 wt %, and very preferably ≥100 wt % of the mixture.

For all embodiments it is in general particularly preferred if the residual monomer content of monomeric diisocyanates in the polyisocyanate composition according to the invention is below 0.3 wt %, based on the total weight of the polyisocyanate composition. The residual monomer contents are determined by gas chromatography according to DIN EN ISO 10283:2007 (Binders for coating materials—Determination of monomeric diisocyanates in isocyanate resins). The term "monomeric diisocyanates" is to be understood presently as a collective term for the aliphatic, cycloaliphatic, araliphatic and/or aromatic diisocyanates used respectively for preparing the polyisocyanates in the polyisocyanate composition according to the invention.

In general, the polyisocyanate composition according to the invention can be present free of solvents, but it is also possible for one or more solvents inert to the reactive groups of the components used to be present.

Suitable solvents are, for example, the customary lacquer solvents known per se such as, e.g. ethyl acetate, butyl acetate, ethylene glycol monomethyl or monoethyl ether acetate, 1-methoxyprop-2-yl acetate, 3-methoxy-n-butyl acetate, acetone, 2-butanone, 4-methyl-2-pentanone, cyclohexanone, toluene, xylene, chlorobenzene, white spirit, more highly substituted aromatics, of the kind available commercially, for example, under the names Solventnaphtha, Solvesso®, Isopar®, Nappar®, Varsol® (ExxonMobil Chemical Central Europe, Cologne, Germany) and Shellsol® (Shell Deutschland Oil GmbH, Hamburg, Germany), and also solvents such as propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such solvents.

By choosing the amount of solvent, the solids content of the polyisocyanate composition according to the invention can be varied within wide limits in the case of the preferred accompanying use of organic solvents. In this case, it is especially preferred if the polyisocyanate composition according to the invention has a solids content of ≥10 and ≤95 wt %, preferably ≥25 and ≤85 wt %.

A process for producing a polyisocyanate composition according to the invention, where the at least one polyisocyanate based on pentamethylene diisocyanate is mixed with the at least one polyisocyanate based on a cycloaliphatic diisocyanate and/or at least one polyisocyanate based on pentamethylene diisocyanate and at least one cycloaliphatic diisocyanate and it is possible, before, simultaneously and/or after, to add one or more auxiliaries and additives.

Preferred is a process for producing a polyisocyanate composition according to the invention, where the at least one polyisocyanate based on pentamethylene diisocyanate is mixed with the at least one polyisocyanate based on a cycloaliphatic diisocyanate or at least one polyisocyanate based on pentamethylene diisocyanate and at least one cycloaliphatic diisocyanate and it is possible, before, simultaneously and/or after, to add one or more auxiliaries and additives. Particularly preferred is a process for producing a polyisocyanate composition according to the invention, where the at least one polyisocyanate based on pentamethylene diisocyanate is mixed with the at least one polyisocyanate based on a cycloaliphatic diisocyanate and it is possible, before, simultaneously and/or after, to add one or more auxiliaries and additives.

The use of a polyisocyanate composition as claimed in any of claims 1 to 5 and 6 as a crosslinking agent in a coating composition. Alternatively, the use of a polyisocyanate composition according to the invention as a crosslinking agent in a coating composition is a further subject of the invention.

The use of pentamethylene diisocyanate in a polyisocyanate composition as claimed in any of claims 1 to 5 and 6 for increasing the chemical resistance of the resulting coating. Alternatively, the use of pentamethylene diisocyanate in a polyisocyanate composition according to the invention for increasing the chemical resistance of the resulting coating is a further subject of the invention.

The polyisocyanate composition according to the invention is very suitable for producing a two-component system, and so a two-component system comprising a component A) comprising at least one polyisocyanate composition according to the invention and a component B) comprising at least one binder reactive toward isocyanate groups, where component A) and/or component B) may comprise at least one flow control assistant and/or further auxiliaries and additives, is a further subject of the invention.

The two-component system according to the invention may be obtained, for example, by mixing the polyisocyanate composition according to the invention with the other compounds.

As a binder reactive toward isocyanate groups in component B) it is possible to use—including in any desired mixtures with one another—any compounds known to those skilled in the art that have a mean OH, NH and/or SH functionality of at least 1.5. These may, for example, be low molecular mass diols (e.g. ethane-1,2-diol, propane-1,3- or -1,2-diol, butane-1,4-diol), triols (e.g. glycerol, trimethylolpropane) and tetraols (e.g. pentaerythritol), short-chain polyamines, but also polyaspartic esters, polythiols and/or polyhydroxyl compounds such as polyether polyols, polyester polyols, polyurethane polyols, polysiloxane polyols, polycarbonate polyols, polyetherpolyamines, polybutadiene polyols, polyacrylate polyols and/or polymethacrylate polyols, and copolymers thereof, called polyacrylate polyols hereinafter.

In a further preferred embodiment, the binder reactive toward isocyanate groups is a polyhydroxyl compound, preferably a polyether polyol, polyester polyol, polycarbonate polyol or polyacrylate polyol.

Any auxiliaries and additives present may, for example, be the following that are known to those skilled in the art: cobinders, desiccants, fillers, cosolvents, color or effect pigments, thickeners, matting agents, light stabilizers, coatings additives such as dispersants, thickeners, defoamers and other auxiliaries such as adhesives, fungicides, bactericides, stabilizers or inhibitors and catalysts or emulsifiers.

A further subject of the invention is a process for producing a coating on a substrate, in which a two-component system according to the invention is applied to the substrate and is cured at a temperature >25° C. and <150° C., preferably >35° C. and <140° C., more preferably >50° C. and <130° C.

The application of the two-component system according to the invention can be effected by known methods, for example by spraying, brushing, flow coating or with the aid of rolls or coating bars onto any desired substrates.

Examples of suitable substrates include metal, glass, stone, ceramic materials, concrete, plastics, composites, textiles, leather or paper, which may optionally also be provided with customary primers prior to coating. Particularly preferred substrates are substrates having a surface of metal and/or plastic.

As well as the above-described preferred use in non-blocked form, however, the polyisocyanate composition according to the invention may also be used as a one-component system, blocked with the blocking agents known from polyurethane chemistry. Blocking agents that can be used in this context include, generally, the compounds described in H.-U. Meier-Westhues, Polyurethane-Lacke, Kleb- und Dichtstoffe, Hanover, Vincentz Network 2007 on pages 36-43 or for example in EP 713871 A1.

By means of the process according to the invention, coatings can be obtained that exhibit improved chemical resistance, particularly with respect to sodium hydroxide solution or pancreatin, in comparison to coatings based on HDI or 2-methylpentane 1,5-diisocyanate.

Therefore a coating produced or producible by the process according to the invention is a further subject of the invention.

As well as the coating itself, the invention further provides a composite composed of the coating according to the invention and a substrate having a surface of metal and/or plastic.

The present invention is more particularly elucidated hereinafter with reference to examples and comparative examples, but without restricting it thereto.

EXAMPLES

All reported percentages are based on weight unless otherwise noted.

The NCO contents are determined by titrimetric means to DIN EN ISO 11909:2007 (Binders for coating materials—Isocyanate resins—General test methods).

All viscosity measurements were made with a Physica MCR 51 rheometer from Anton Paar Germany GmbH (DE) to DIN EN ISO 3219:1994 (Plastics—Polymers/resins in the liquid state or as emulsions or dispersions—Determination of viscosity using a rotational viscometer with defined shear rate).

Polyisocyanate 1 (Based on m-PDI)

An initial charge of 100 g (0.59 mol) of 2-methylpentamethylene 1,5-diisocyanate (m-PDI) in a four-neck flask equipped with stirrer, reflux condenser, $N_2$ passage tube and internal thermometer was degassed three times at room temperature by applying a vacuum of about 50 mbar and vented with nitrogen. Subsequently, the mixture was heated to 60° C. and the catalyst solution (0.5% N,N,N-trimethyl-N-benzylammonium hydroxide solution in a 1:1 mixture of 2-ethyl-1-hexanol and 2-ethyl-1,3-hexanediol) was metered in at a rate such that the temperature of the reaction mixture, in spite of the exothermically ensuing trimerization reaction, increased to a maximum of 74° C. On attainment of an NCO content of 40.2 wt %, dibutyl phosphate (80 mol % based on trimethylbenzylammonium hydroxide used) was used to stop the reaction, and the unreacted monomeric PDI was removed at a temperature of 140° C. and a pressure of 0.5 mbar on a thin-film evaporator. This gave a virtually colorless, high-viscosity polyisocyanurate polyisocyanate which, as a 90% solution in butyl acetate, had the following characteristic data:

NCO content: 18.4%
Viscosity (23° C.): 1800 mPa·s
Solids content (butyl acetate): 90%

Polyisocyanate 2 (Based on PDI)

An initial charge of 1000 g (6.49 mol) of pentamethylene 1,5-diisocyanate (PDI) in a four-neck flask equipped with stirrer, reflux condenser, N2 passage tube and internal thermometer was degassed three times at room temperature and vented with nitrogen. Subsequently, the mixture was heated to 60° C. and 9.0 ml of the catalyst solution (1.5% N,N,N-trimethyl-N-benzylammonium hydroxide solution in methanol and 2-ethylhexanol) were metered in such that the exothermic trimerization was held at a temperature of 60-80° C. On attainment of an NCO content of 36.7 wt %, dibutyl phosphate (equimolar amount based on trimethylbenzylammonium hydroxide used) was used to stop the reaction, and the excess PDI was removed at 140° C. and a pressure of 0.5-0.6 mbar via thin-film distillation. The resultant resin had the following characteristics:

NCO content: 21.5%
Solids content: 100%
Polyisocyanate 3 (Based on HDI) Desmodur® N 3390 BA
NCO content: 19.6%
Solids content (butyl acetate): 90%
Polyisocyanate 4 (Based on IPDI) Desmodur® Z 4470
NCO content: 11.9%
Solids content (butyl acetate): 70%

To ascertain the general mechanical data of the cured 2K PU coatings, clearcoats with the following composition were applied by spraying to substrates in accordance with stated property analyses, and cured at 130° C. for 30 min.

TABLE 1

Composition of the 2K PU clearcoats

| | | Formulation | | | | | |
|---|---|---|---|---|---|---|---|
| | Solids content | A (comp.) | B (inv.) | C (comp.) | D (comp.) | E (comp.) | F (comp.) |
| Component A (binder) | | | | | | | |
| Macrynal SM 510n/60XMPAC (OH content: 2.7) | 60% | 49.58 | 50.37 | 51.34 | 48.75 | 49.43 | 49.80 |
| Tinuvin 1130, 8% in xylene | 8% | 2.92 | 2.93 | 2.98 | 2.92 | 2.93 | 2.94 |
| Tinuvin 292, 8% in xylene | 8% | 2.92 | 2.93 | 2.98 | 2.92 | 2.93 | 2.94 |
| Octa-Soligen Calcium 4, basic - as supplied | 20% (as supplied) | 0.84 | 0.85 | 0.86 | 0.84 | 0.84 | 0.85 |

TABLE 1-continued

Composition of the 2K PU clearcoats

| | Solids content | Formulation A (comp.) | B (inv.) | C (comp.) | D (comp.) | E (comp.) | F (comp.) |
|---|---|---|---|---|---|---|---|
| Addocat 201 (DBTL) 1% in BA | 1% | 0.47 | 0.47 | 0.48 | 0.47 | 0.47 | 0.47 |
| 3M Novec Fluorosurfactant FC-4430 with DPM, 10% in BA | 10% | 2.11 | 2.11 | 2.15 | 2.10 | 2.11 | 2.11 |
| Component B (curing agent) | | | | | | | |
| Polyisocyanate 1 in butyl acetate | 90% | 13.25 | | | 9.66 | | |
| Polyisocyanate 2 | 100% | | 11.70 | | | 8.57 | |
| Polyisocyanate 3 in butyl acetate | 90% | | | 13.09 | | | 9.51 |
| Polyisocyanate 4 in butyl acetate | 70% | 7.30 | 7.17 | 7.21 | 12.40 | 12.24 | 12.24 |
| Weight ratio of aliphatic/cycloaliphatic polyisocyanates (solid resins) | | 7:3 | 7:3 | 7:3 | 1:1 | 1:1 | 1:1 |
| Butyl acetate/xylene/DBE (41.4:41.0:17.6) | | 20.61 | 21.47 | 18.91 | 19.94 | 20.48 | 19.14 |
| Total | | 100.0 | 100.0 | 100.0 | 100.0 | 100.0 | 100.0 |
| NCO/OH ratio | | 1.0 | 1.0 | 1.0 | 1.0 | 1.0 | 1.0 | comp. = comparative example;
inv. = example according to the invention

The test for resistance of the cured clearcoats to simulated environmental influences was conducted according to DIN EN ISO 2812-5:2007-05 Determination of resistance to liquids—Part 5. Temperature-gradient oven method (ISO 2812-5:2017). The respective formulations were applied uniformly to steel gradient test panels in a two-coat system (clearcoat 40 µm±10 µm over black basecoat 10-15 µm (Spies Hecker, Permacron® basecoat 293 RAL 9005 jet black, predried at 80° C. for 10 min)) and dried at 130° C. for 30 min. Thus prepared, the test panels were provided as per the gradient oven method with the corresponding test liquids and then subjected to a linear temperature gradient of 36°-68° C. After these exposures the panels were washed down with clear water and assessed after 1 and 24 hours to estimate not only the direct damage but also any self-healing properties of the coatings. For this assessment, the areas of first recognizable clearcoat attack were employed.

The results of the investigation (table 2—Resistance of clearcoats to simulated environmental influences) show that the comparative example of formulation C (polyisocyanate 3 and 4 in a ratio of 7:3) shows the weakest resistance to tree resin and to sodium hydroxide solution.

The comparative example of formulation A (polyisocyanate 1 and 4 in a ratio of 7:3) shows a weak resistance to alkali solution in combination with only moderate resistance to tree resin. The example according to the invention of formulation B (polyisocyanate 2 and 4 in a ratio of 7:3) shows not only very good resistance to tree resin but also the best resistance to sodium hydroxide solution.

TABLE 2

Resistance of the clearcoats to simulated environmental influences

| Formulation Test substances (gradient oven) | A Comp. Ex. | B Inv. Ex. | C Comp. Ex. | D Comp. Ex. | E Comp. Ex. | F Comp. Ex. |
|---|---|---|---|---|---|---|
| | | | Assessment after 1 h/24 h | | | |
| Tree resin | 54°/54° | 60°/60° | 44°/44° | 56°/56° | 58°/58° | 58°/58° |
| Pancreatin (1:1 dilution in water) | 36°/36° | 36°/36° | 36°/36° | 36°/36° | 36°/36° | 36°/36° |
| Deionized water | >68°/>68° | >68°/>68° | >68°/>68° | >68°/>68° | >68°/>68° | >68°/>68° |
| Sodium hydroxide (1% in water) | 60°/60° | 64°/64° | 58°/58° | 53°/53° | 67°/67° | 67°/67° |
| Sulfuric acid (1% in water) | 50°/50° | 51°/51° | 50°/50° | 50°/50° | 51°/51° | 52°/52° |

When the cycloaliphatic polyisocyanate fraction in the formulations is increased to a ratio of 1:1, formulations D, E and F show an almost similar level in terms of tree resin resistance, but the comparative example of formulation D (polyisocyanate 1 and 4 in a ratio of 1:1) falls in resistance to alkali solution, which is undesirable.

According to the stated object, the desire is not only for high resistance to environmental influences but also for a scratch-resistant coating, as scratches detract massively from the gloss of the surface (similarly to the environmental influences).

To test the resistance to wet mechanical stress, black test coil coating panels (CS-300570; Zanders PBL, Solingen, Germany) were spray-coated with clearcoat at 40 µm±10 µm and exposed to a wet scratching cycle (10 movements) in the Amtec-Kistler laboratory carwash.

TABLE 3

Resistance of the clearcoats to wet-chemical stress

| | | Formulation | | | | | |
|---|---|---|---|---|---|---|---|
| | | A Comp. Ex. | B Inv. Ex. | C Comp. Ex. | D Comp. Ex. | E Comp. Ex. | F Comp. Ex. |
| Gloss 20° | Starting gloss | 88 | 88 | 88 | 88 | 87 | 88 |
| | Residual gloss | 31 | 42 | 43 | 29 | 36 | 36 |
| Relative residual gloss | | 35% | 48% | 49% | 33% | 41% | 41% |
| Gloss 20° | Self-healing after 2 h 60° C. | 33 | 44 | 44 | 29 | 37 | 37 |
| Relative residual gloss | | 38% | 50% | 50% | 33% | 43% | 43% |

To evaluate the scratch resistance and self-healing properties of the clearcoat, the gloss was measured—before scratch exposure (initial gloss), after scratch exposure and after self-healing at 60° C. over a period of two hours. As is apparent from table 3, formulations A and D (polyisocyanate 1 and 4) show the least resistance to wet mechanical stress. Formulations B, E (polyisocyanates 2 and 4) and formulations C and F (polyisocyanate 3 and 4) show a relatively high level in resistance to wet scratch exposure.

The desirable optimum resistance to simulated environmental influences and mechanical stress was, surprisingly, achieved with the combination of polyisocyanate 2 and 4.

The invention claimed is:

1. A polyisocyanate composition comprising a mixture of ≥60 wt %, based on the total weight of the mixture, of at least one polyisocyanate based on pentamethylene diisocyanate and ≥1 wt % to ≤40 wt %, based on the total weight of the mixture, of at least one polyisocyanate based on a cycloaliphatic diisocyanate, wherein the polyisocyanate composition has a residual monomer content of monomeric diisocyanates of below 0.5 wt %, based on the total weight of the polyisocyanate composition, and the polyisocyanates are in nonblocked form.

2. The polyisocyanate composition as claimed in claim 1, wherein the mixture comprises ≥70 wt %, based on the total weight of the mixture, of the at least one polyisocyanate based on pentamethylene diisocyanate, and fractions making up the balance to 100 wt % consist of the at least one polyisocyanate based on a cycloaliphatic diisocyanate.

3. The polyisocyanate composition as claimed in claim 1, wherein the mixture comprises ≥2 wt %, based on the total weight of the at least one polyisocyanate based on a cycloaliphatic diisocyanate.

4. The polyisocyanate composition as claimed in claim 1, wherein the cycloaliphatic diisocyanate of the at least one polyisocyanate based on cycloaliphatic diisocyanate is selected from the group consisting of 1,3-diisocyanatocyclohexane, 1,4-diisocyanatocyclohexane, 2,4-diisocyanato-1-methylcyclohexane, 2,6-diisocyanato-1-methylcyclohexane, 1,3-bis(isocyanatomethyl)cyclohexane, 1,4-bis(isocyanatomethyl)cyclohexane, 1-isocyanato-3,3,5-trimethyl-5-isocyanatomethylcyclohexane, 4,4'-diisocyanatodicyclohexylmethane, 2,4'-diisocyanatodicyclohexylmethane, 1-isocyanato-1-methyl-4(3)-isocyanatomethylcyclohexane, and bis(isocyanatomethyl)norbornane.

5. The polyisocyanate composition as claimed in claim 1, wherein the polyisocyanate composition comprises to an extent of ≥70 wt %, of the mixture.

6. A process for producing a polyisocyanate composition as claimed in claim 1, wherein the at least one polyisocyanate based on pentamethylene diisocyanate is mixed with the at least one polyisocyanate based on a cycloaliphatic diisocyanate and one or more selected from the group consisting of auxiliaries and additives.

7. A coating composition including the polyisocyanate composition as claimed in claim 1 as a crosslinking agent.

8. In a process for increasing the chemical resistance of a coating, the improvement comprising including the pentamethylene diisocyanate in the polyisocyanate composition as claimed in claim 1.

9. A two-component system comprising:
component A) comprising at least one polyisocyanate composition as claimed in claim 1; and
component B) comprising at least one binder reactive toward isocyanate groups, wherein at least one of component A) and/or component B) optionally further comprises at least one selected from the group consisting of flow control assistant and auxiliaries and additives.

10. A process for producing a coating on a substrate, wherein the two-component system as claimed in claim 9 is applied to the substrate and is cured at a temperature >25° C.

11. The coating produced by the process as claimed in claim 10.

12. A composite comprising the coating as claimed in claim 11 and a substrate having a surface selected from the group consisting of metal and plastic.

* * * * *